(12) United States Patent
Maruyama

(10) Patent No.: US 10,280,087 B2
(45) Date of Patent: May 7, 2019

(54) SHEET MANUFACTURING DEVICE AND MANUFACTURING METHOD

(71) Applicant: LINTEC CORPORATION, Tokyo (JP)

(72) Inventor: Takayuki Maruyama, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/559,015

(22) PCT Filed: Nov. 12, 2015

(86) PCT No.: PCT/JP2015/081833
§ 371 (c)(1),
(2) Date: Sep. 15, 2017

(87) PCT Pub. No.: WO2016/147475
PCT Pub. Date: Sep. 22, 2016

(65) Prior Publication Data
US 2018/0079646 A1    Mar. 22, 2018

(30) Foreign Application Priority Data
Mar. 17, 2015    (JP) .................................. 2015-053370

(51) Int. Cl.
*B82Y 30/00*    (2011.01)
*B82Y 40/00*    (2011.01)
(Continued)

(52) U.S. Cl.
CPC .............. *C01B 32/176* (2017.08); *B32B 9/00* (2013.01); *B32B 9/04* (2013.01); *B32B 37/025* (2013.01);
(Continued)

(58) Field of Classification Search
CPC ...... C01B 32/176; B32B 39/00; B32B 37/025
See application file for complete search history.

(56) References Cited

U.S. PATENT DOCUMENTS

2006/0274048 A1    12/2006  Spath et al.
2008/0018012 A1*    1/2008  Lemaire ................. B82Y 30/00
                                                           264/82
(Continued)

FOREIGN PATENT DOCUMENTS

JP    2008-542953 A    11/2008
JP    2010-285344 A    12/2010
(Continued)

OTHER PUBLICATIONS

Search Report issued in corresponding International Patent Application No. PCT/JP2015/081833, dated Dec. 22, 2015.
(Continued)

*Primary Examiner* — Alison L Hindenlang
*Assistant Examiner* — Mini A Brebion
(74) *Attorney, Agent, or Firm* — McDermott Will & Emery LLP

(57) ABSTRACT

A sheet manufacturing device includes: a feeder configured to feed a sheet; and a transferring unit configured to transfer carbon nanotubes with a predetermined length onto the sheet, the transferring unit including: a drawing unit configured to draw the carbon nanotubes from a grown form of the carbon nanotubes in a direction intersecting with a feeding direction of the sheet; and a cutter configured to cut the drawn carbon nanotubes.

5 Claims, 2 Drawing Sheets

(51) Int. Cl.
    *C01B 32/176*    (2017.01)
    *B32B 9/00*    (2006.01)
    *B32B 9/04*    (2006.01)
    *B32B 37/00*    (2006.01)

(52) U.S. Cl.
    CPC ............... *B82Y 30/00* (2013.01); *B82Y 40/00* (2013.01); *C01B 2202/08* (2013.01); *Y10S 977/742* (2013.01); *Y10S 977/842* (2013.01)

(56) References Cited

U.S. PATENT DOCUMENTS

2014/0216650 A1    8/2014    Chiba
2017/0313101 A1*   11/2017   Arippol ..................... B32B 9/00

FOREIGN PATENT DOCUMENTS

| | | |
|---|---|---|
| JP | 2012-183583 A | 9/2012 |
| JP | 2014-152049 A | 8/2014 |
| JP | 2015-040134 A | 3/2015 |
| TW | 201323325 A | 6/2013 |
| TW | 201431776 A | 8/2014 |
| WO | 2008/013517 A2 | 1/2008 |

OTHER PUBLICATIONS

English translation of International Preliminary Report on Patentability issued in corresponding International Patent Application No. PCT/JP2015/081833, dated Sep. 19, 2017.
Notification of Examiner's Opinion issued in Taiwanese Patent Application No. 104139433, dated Dec. 25, 2018 (English Translation).

* cited by examiner

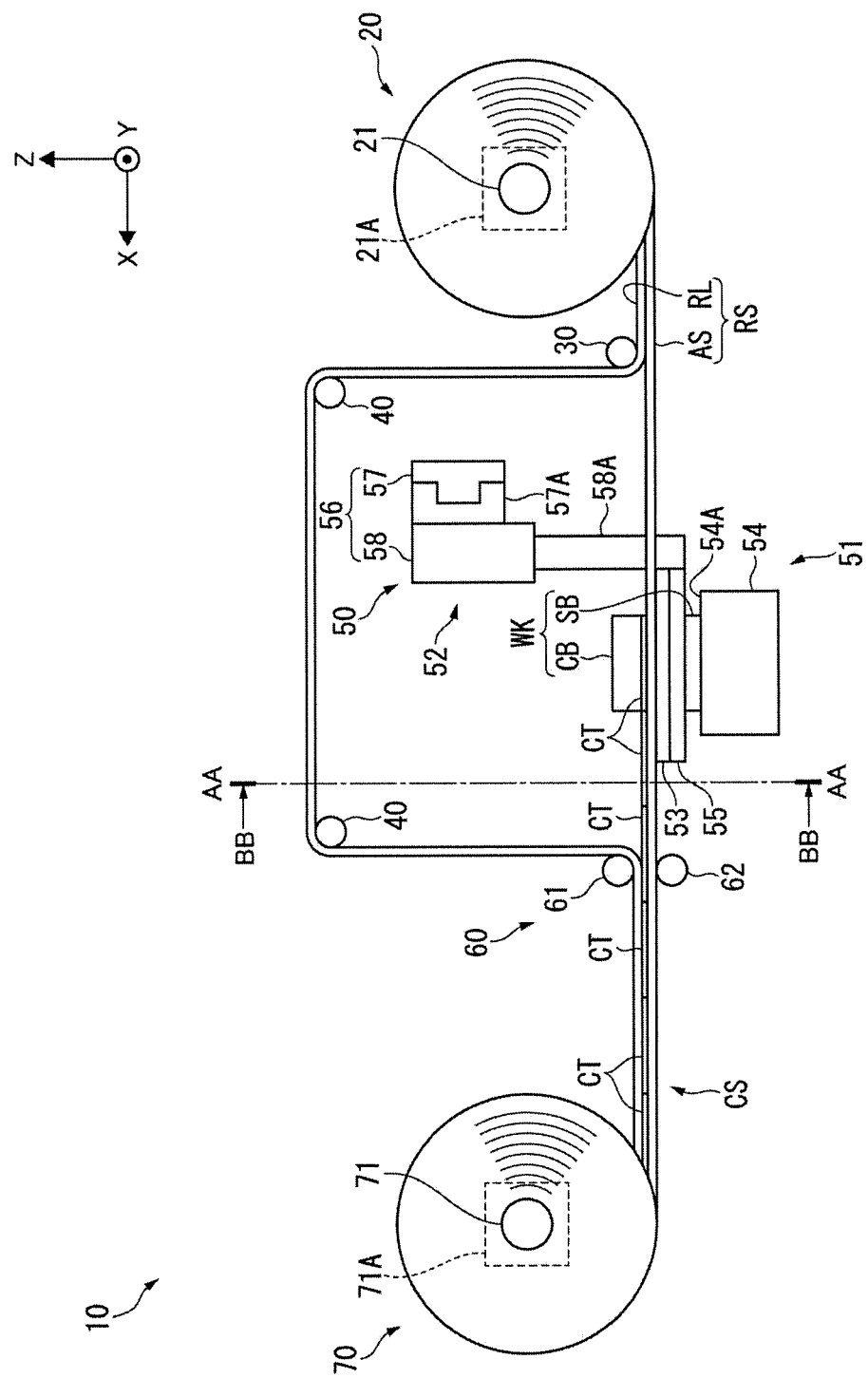

SHEET MANUFACTURING DEVICE AND MANUFACTURING METHOD

CROSS REFERENCE

This application is the U.S. National Phase under 35 U.S.C. § 371 of International Application No. PCT/JP2015/081833, filed on Nov. 12, 2015, which claims the benefit of Japanese Application No. 2015-053370, filed on Mar. 17, 2015, the entire contents of each are hereby incorporated by reference.

TECHNICAL FIELD

The present invention relates to a sheet manufacturing device and a sheet manufacturing method.

BACKGROUND ART

A device for manufacturing a carbon nanotube structure (carbon nanotube sheet) where carbon nanotubes drawn from an array (grown form) are transferred on a base film (sheet) has been known (see, for instance, Patent Literature 1).

CITATION LIST

Patent Literature(s)

Patent Literature 1: JP 2010-285344 A

SUMMARY OF THE INVENTION

Problem(s) to be Solved by the Invention

However, such a typical device as described in Patent Literature 1, which is configured to draw carbon nanotubes along a feeding direction of a sheet having been fed in a predetermined direction and transfer them onto the sheet, requires a grown form having a width equal to or larger than the width of the sheet in order to manufacture a carbon nanotube sheet with carbon nanotubes transferred across the sheet. The grown form thus disadvantageously needs to be changed in line with a change in the width of the sheet.

An object of the invention is to provide a sheet manufacturing device and a sheet manufacturing method capable of manufacturing a carbon nanotube sheet with carbon nanotubes transferred across a sheet without the necessity for changing a grown form in response to a change in a sheet width.

Means for Solving the Problem(s)

In order to achieve the object, according to an aspect of the invention, a sheet manufacturing device configured to manufacture a carbon nanotube sheet with carbon nanotubes transferred on a first sheet, the sheet manufacturing device includes: a feeder configured to feed the first sheet; and a transferring unit configured to transfer the carbon nanotubes with a predetermined length onto the first sheet, the transferring unit including: a drawing unit configured to draw the carbon nanotubes from a grown form of the carbon nanotubes in a direction intersecting with a feeding direction of the first sheet; and a cutter configured to cut the drawn carbon nanotubes.

In the above aspect, it is preferable that the sheet manufacturing device further includes a separating unit configured to separate a second sheet from a raw sheet including the first sheet and the second sheet that has been temporarily attached to a surface of the first sheet; a diverting unit configured to divert the separated second sheet; and a laminating unit configured to laminate the second sheet onto the carbon nanotubes transferred on the first sheet.

Further, in the above aspect, it is preferable that the first sheet includes laminated carbon nanotubes aligned thereon along the feeding direction of the first sheet, and the transferring unit is configured to transfer the drawn carbon nanotubes onto the first sheet.

According to another aspect of the invention, a sheet manufacturing method for manufacturing a carbon nanotube sheet with carbon nanotubes transferred on a first sheet, the sheet manufacturing method includes: feeding the first sheet; and transferring the carbon nanotubes onto the first sheet, the transferring including: drawing the carbon nanotubes from a grown form of the carbon nanotubes in a direction intersecting with a feeding direction of the first sheet; and cutting the drawn carbon nanotubes.

Further, in the above aspect, it is preferable that the first sheet includes laminated carbon nanotubes aligned thereon along the feeding direction of the first sheet, and the transferring includes transferring the drawn carbon nanotubes onto the first sheet.

According to the above aspects of the invention, the carbon nanotubes are drawn from the grown form in the direction intersecting with the feeding direction of the first sheet and the carbon nanotubes with a predetermined length are transferred onto the first sheet, which allows for manufacturing the carbon nanotube sheet with the carbon nanotubes transferred across the first sheet without the necessity for changing the grown form in response to a change in the width of the adhesive sheet.

Additionally, the second sheet may be laminated on the carbon nanotubes transferred on the sheet to protect the carbon nanotubes.

Further, the second sheet may be separated from the raw sheet, which includes the first sheet and the second sheet that has been temporarily attached to the first sheet, and diverted to be laminated on the carbon nanotubes transferred on the first sheet. The number of support unit(s) for supporting the raw sheet can thus be reduced to one, which results in downsizing the sheet manufacturing device and replacing the raw sheet with an improved efficiency.

BRIEF DESCRIPTION OF DRAWING(S)

FIG. 1 is a side view showing a sheet manufacturing device according to an exemplary embodiment of the invention.

DESCRIPTION OF EMBODIMENT(S)

Figure 2A:
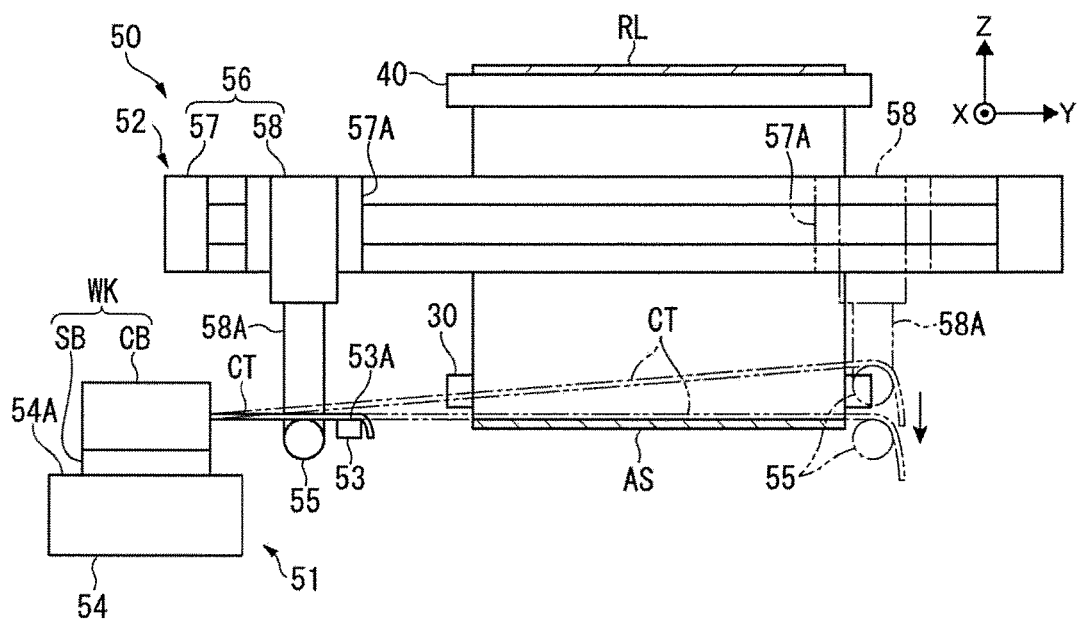
FIG. 2A is a cross section taken along AA-AA as seen on arrows BB in FIG. 1 for illustrating a motion of the sheet manufacturing device.

Exemplary embodiment(s) of the invention will be described below with reference to the attached drawings.

Incidentally, X-axis, Y-axis and Z-axis according to the exemplary embodiment are orthogonal to one another, the X-axis and Y-axis being defined in a predetermined plane, the Z-axis being orthogonal to the predetermined plane. Further, directions according to the exemplary embodiment are defined as viewed from the near side with reference to a direction parallel with the Y-axis in FIG. 1. Specifically, "up" means a direction indicated by a Z-axis arrow and "down" means the opposite direction thereof, "left" means a direction indicated by an X-axis arrow and "right" means the opposite direction thereof, and "front" means a direction toward the near side on a Y-axis arrow in FIG. 1 and "back" means the opposite direction thereof.

As shown in FIG. 1, a sheet manufacturing device 10, which is a sheet manufacturing device for manufacturing a carbon nanotube sheet CS with carbon nanotubes CT transferred on an adhesive sheet AS (first sheet), includes a feeder 20 configured to feed a raw sheet RS including the adhesive sheet AS and a release liner RL (second sheet) that is temporarily attached to an adhesive surface (first surface) of the adhesive sheet AS, a separating roller 30 (separating unit) configured to separate the release liner RL from the raw sheet RS, a pair of diverting rollers 40 (diverting unit) configured to divert the separated release liner RL, a transferring unit 50 configured to transfer the carbon nanotubes CT with a predetermined length onto the adhesive sheet AS separated from the release liner RL by the diverting rollers 40, a laminating unit 60 configured to laminate the release liner RL onto the carbon nanotubes CT transferred on the adhesive sheet AS, and a collecting unit 70 configured to collect the thus-obtained carbon nanotube sheet CS.

The feeder 20, which is driven by a rotary motor 21A (drive unit), includes a support roller 21 supporting the raw sheet RS.

As also shown in FIG. 2, the transferring unit 50 includes a holder 51 configured to hold a forest (also referred to as array) CB of the carbon nanotubes CT (i.e., a grown form of the carbon nanotubes CT), a drawing unit 52 configured to draw the carbon nanotubes CT from the forest CB held by the holder 51 in a front-back direction (direction intersecting with a feeding direction of the adhesive sheet AS), a support member 53 coplanar with the first surface (adhesive surface) of the adhesive sheet AS separated by the separating roller 30 and having a support surface 53A for supporting the carbon nanotubes CT drawn by the drawing unit 52, and a cutter for cutting the drawn carbon nanotubes CT. It should be noted that the forest CB, which is formed by growing the carbon nanotubes CT on a first surface of a substrate SB, is provided in the form of an integrated workpiece WK together with the substrate SB on which the forest CB is supported.

The holder 51 includes a table 54 with a holding surface 54A on which the integrated workpiece WK (i.e., a second surface of the substrate SB opposite to the first surface) is sucked and held by using a decompression device such as a decompression pump or a vacuum ejector (not shown).

The drawing unit 52 includes a drawing member 55 configured to draw the carbon nanotubes CT and a transporting unit 56 configured to transport the drawing member 55. The drawing member 55 extends in a direction perpendicular to a drawing direction of the carbon nanotubes CT (i.e., front-back direction) and has a circular cross section. The transporting unit 56, which includes a linear motor 57 (drive unit) extending in the front-back direction and a linear movement motor 58 (drive unit) supported on a slider 57A of the linear motor 57, is configured to move the drawing member 55 supported on an output shaft 58A of the linear movement motor 58 in an up-down direction.

A lower portion of the drawing member 55 serves as the cutter in the exemplary embodiment.

The laminating unit 60 includes a press roller 61 configured to press the release liner RL onto the carbon nanotubes CT transferred on the adhesive sheet AS and a receiving roller 62 facing a second surface of the adhesive sheet AS.

The collecting unit 70, which is configured to be driven by a rotary motor 71A (drive unit), includes a collecting roller 71 configured to collect the carbon nanotube sheet CS.

Description will be made on a process for manufacturing the carbon nanotube sheet CS with the sheet manufacturing device 10.

First, the raw sheet RS is set by an operator as shown in FIG. 1 and, subsequently, the integrated workpiece WK is mounted on the holding surface 54A at a predetermined position by the operator or a conveyor unit such as an articulated robot or a belt conveyor (not shown). Next, the holder 51 drives the decompression device (not shown) to suck and hold the integrated workpiece WK on the holding surface 54A. Subsequently, the operator draws the carbon nanotubes CT from the forest CB and sets the drawn ends of the carbon nanotubes CT on the support member 53 as shown by solid lines in FIG. 2A. Specifically, a viscosity exhibited by the drawn carbon nanotubes CT allows the carbon nanotubes CT to be supported on the support member 53. Further, the drawn carbon nanotubes CT, which are attached together by Van der Waals force, are aligned in the form of a belt along the drawing direction.

When the operator inputs a signal for starting an automatic operation using an input unit such as an operation panel or a personal computer (not shown), the feeder 20 and the collecting unit 70 respectively drive the rotary motors 21A, 71A to feed the raw sheet RS. When a detecting unit such as an optical sensor or an imaging device detects that the adhesive sheet AS reaches a predetermined position, the feeder 20 and the collecting unit 70 stop the driving of the rotary motors 21A, 71A. Subsequently, the drawing unit 52 drives the linear movement motor 58 to lift the drawing member 55 above the adhesive sheet AS and the support member 53, and then drives the linear motor 57 to move the drawing member 55 forward as shown by upper chain double-dashed lines in FIG. 2A, thereby drawing the carbon nanotubes CT from the forest CB. The drawing unit 52 then drives the linear movement motor 58 to move the drawing member 55 downward as shown by lower chain double-dashed lines in FIG. 2A, thereby transferring the carbon nanotubes CT onto the adhesive sheet AS.

Figure 2B:
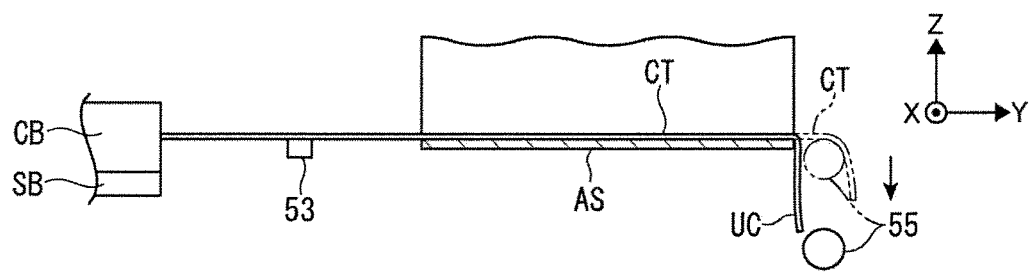
FIG. 2B illustrates a motion of the sheet manufacturing device subsequent to the motion illustrated in FIG. 2A.
Figure 2C:
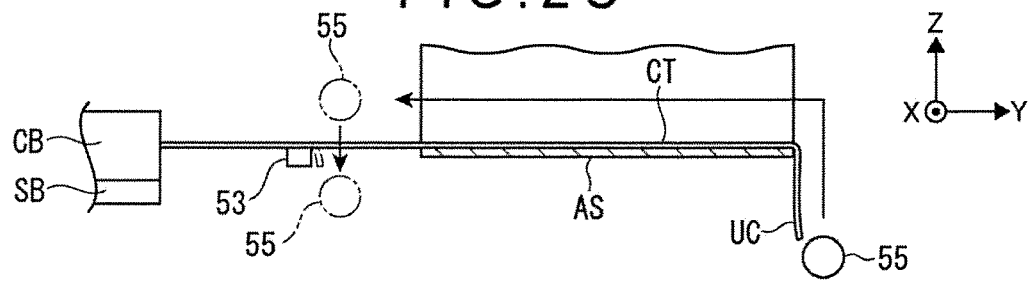
FIG. 2C illustrates a motion of the sheet manufacturing device subsequent to the motion illustrated in FIG. 2B.
Figure 2D:
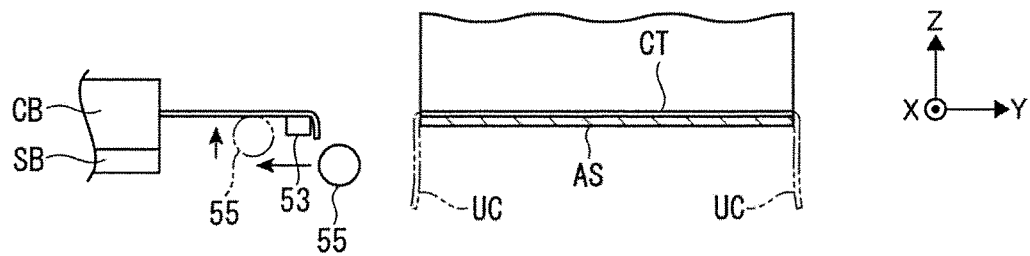
FIG. 2D illustrates a motion of the sheet manufacturing device subsequent to the motion illustrated in FIG. 2C.

Subsequently, the drawing unit 52 drives the linear movement motor 58 to move the drawing member 55 further downward as shown by solid lines in FIG. 2B, thereby separating the drawing member 55 from the carbon nanotubes CT. The drawing unit 52 then drives the linear motors 57 and the linear movement motor 58 to move the drawing member 55 above and between the adhesive sheet AS and the support member 53 as shown by an upper chain double-dashed line in FIG. 2C. The drawing unit 52 then drives the linear movement motor 58 to move the drawing member 55 downward as shown in a lower chain double-dashed line in FIG. 2C, thereby cutting the carbon nanotubes CT transferred on the adhesive sheet AS. The carbon nanotubes CT thus have rear ends and new drawn ends. Simultaneously, as shown in FIG. 2D, the carbon nanotube sheet CS with the carbon nanotubes CT transferred on the adhesive sheet AS is manufactured, while the new drawn ends are supported by the support member 53.

Subsequently, the drawing unit 52 drives the linear motor 57 and the linear movement motor 58 to move the drawing member 55 to an initial position as shown by a chain double-dashed line in FIG. 2D, and then unnecessary tubes UC protruding from front and rear ends of the adhesive sheet AS are cut with an unnecessary-tube cutter (not shown). Further, the feeder 20 and the collecting unit 70 drive the rotary motors 21A, 71A to feed the raw sheet RS such that the carbon nanotubes CT to be next drawn are to be transferred at a position right adjacent to the already transferred carbon nanotubes CT, and then stop the driving of the rotary motors 21A, 71A. Specifically, the release liner RL is separated from the fed raw sheet RS by the separating roller 30 and the separated release liner RL is diverted around the transferring unit 50 by the diverting roller 40. Further, the diverted release liner RL is laminated on the carbon nanotubes CT by the laminating unit 60 and collected as the carbon nanotube sheet CS by the collecting unit 70. The above operation is repeated to manufacture the carbon nanotube sheet CS in which the carbon nanotubes CT are transferred continuously in a right-left direction of the adhesive sheet AS.

In the above exemplary embodiment, the carbon nanotubes CT are drawn from the forest CB in the front-back direction intersecting with the feeding direction of the adhesive sheet AS and the carbon nanotubes CT with the predetermined length are transferred onto the adhesive sheet AS, which allows for manufacturing the carbon nanotube sheet CS with the carbon nanotubes CT transferred across the adhesive sheet AS without the necessity for changing the forest CB in response to a change in the width of the adhesive sheet AS.

Although the best arrangement, method, and the like for carrying out the invention have been described above, the scope of the invention is not limited thereto. In other words, while the invention has been particularly explained and illustrated mainly in relation to a specific embodiment, a person skilled in the art could make various modifications in terms of shape, material, quantity or other particulars to the above described embodiment without deviating from the technical idea or any object of the invention. Further, any descriptions of shape, material or the like disclosed above are given as examples to enable easy understanding of the invention, and do not limit the invention, so that descriptions using names of components, with any such limitations of shape, material or the like separated in part or whole, are included in the present invention.

The sheet manufacturing device 10 may be configured to manufacture the carbon nanotube sheet CS in which two or more layers of the carbon nanotubes CT are laminated on a first or second surface of the first sheet or, alternatively, manufacture the carbon nanotube sheet CS in which a single or two or more layers of the carbon nanotubes CT are laminated on each of the first and second surfaces of the first sheet. In this case, the first sheet may include carbon nanotubes aligned thereon along the feeding direction of the first sheet and the transferring unit 50 may transfer the drawn carbon nanotubes CT onto the first sheet.

It is not essential that the sheet manufacturing device 10 feeds the adhesive sheet AS each time the carbon nanotubes CT is transferred. For instance, the transferring unit 50 may be movable in the feeding direction of the adhesive sheet AS so that the feeder 20 feeds the adhesive sheet AS after the carbon nanotubes CT are transferred onto the adhesive sheet AS for a predetermined number of times.

The feeder 20 may feed either one of the adhesive sheet AS and the release liner RL as the first sheet to manufacture the carbon nanotube sheet CS including the one of the adhesive sheet AS and the release liner RL on which the carbon nanotubes CT are transferred. In such a case, the diverting unit and the laminating unit 60 are not essential.

Alternatively, while either one of the adhesive sheet AS and the release liner RL is fed as the first sheet by the feeder 20, the other one of the release liner RL and the adhesive sheet AS may be fed as the second sheet by another feeder and laminated onto the adhesive sheet AS or the release liner RL (the first sheet) with the carbon nanotubes CT transferred thereon by the laminating unit 60, thereby manufacturing the carbon nanotube sheet CS including the adhesive sheet AS, the carbon nanotubes CT and the release liner RL.

The feeder 20 may feed a base material as a sheet including none of an adhesive layer and a release layer.

The feeder 20 may include a detecting unit configured to detect an edge of the transferred carbon nanotubes CT near the support roller 21. A feeding amount of the raw sheet RS may be adjusted based on the detected edge.

The separating unit may be a plate-shaped blade member.

The diverting roller(s) 40 may include a single roller or three or more rollers.

The diverting unit may divert the release liner RL below, in front of or behind the transferring unit 50 or may diver the adhesive sheet AS after the release liner RL is separated from the raw sheet RS.

The transferring unit 50 may include a plurality of units arranged side by side in the feeding direction of the first sheet or may be located at the front side, the back side or both the front and back sides of the sheet.

The transferring unit 50 may hold or support the integrated workpiece WK or the carbon nanotubes CT with a chuck (e.g., a mechanical chuck and a chuck cylinder), Coulomb's force, adhesive agent, adhesive sheet, magnetic force, or the like.

The holder 51 may directly hold the forest CB itself on the holding surface 54A.

The drawing unit 52 draws the carbon nanotubes CT in the direction intersecting with the feeding direction of the adhesive sheet AS, which may be a diagonally forward/backward right direction or a diagonally forward/backward left direction.

It is not essential that the drawing member 55 of the drawing unit 52 serves also as the cutter. For instance, a cutter independent of the drawing member 55, such as a cutter blade, a laser cutter, a heat cutter, an air cutter and a compressed-water cutter, may be used and/or such an independent cutter may serve also as the unnecessary-tube cutter.

The drawing unit 52 may include a support member and/or a drawing member formed of blade material, rubber, resin material, sponge or the like, and a cross section of such a member(s) may be of an oval shape, a polygonal shape (e.g., triangle and rectangle) or any other shape.

The laminating unit 60 may also include a pressing force adjuster for adjusting a pressing force of the press roller 61. The pressing force adjuster may include a linear movement motor (drive unit) for adjusting a position of each of the press roller 61 and the receiving roller 62 in a thickness direction of the raw sheet RS and a pressure detecting unit such as a pressure sensor or a load cell for detecting the pressing force.

The press roller 61 and the receiving roller 62 may be driven by a rotary motor (drive unit) and/or may be provided with an encoder to adjust the rotation amount thereof.

Further, the adhesive sheet AS according to the invention is not specifically limited in terms of material, type, shape and the like. For instance, the adhesive sheet AS may be of a round shape, an oval shape, a polygonal shape (e.g., triangle and rectangle) or any other shape and may be capable of pressure-sensitive adhesion, thermosensitive adhesion or any other kind of adhesion. Further, when the adhesive sheet AS capable of thermosensitive adhesion is employed, the adhesive sheet AS may be attached in any appropriate way such as using a heater suitable for heating the adhesive sheet AS (e.g., a coil heater and the heating side of a heat pipe). Further, for instance, such an adhesive sheet AS may include a single adhesive layer only, include a base material, an adhesive layer and an intermediate layer therebetween, or include three or more layers including, for instance, a base material and a cover layer located on an upper surface of the base material. Additionally, the adhesive sheet AS may be a so-called double-sided adhesive sheet capable of separation of a base material from an adhesive layer and such a double-sided adhesive sheet may include a single or a plurality of intermediate layers or a single or a plurality of layers including no intermediate layer.

The method and process according to the invention are by no means limited as long as the operations, functions or steps explained in relation thereto can be performed, and are, of course, not limited to the arrangements and processes described merely as examples in the exemplary embodiment at all. For instance, any feeder conceivable within a technical range in light of technical knowledge at the time of filing of the present application is usable as long as the feeder can feed the sheet (the explanations of other units and processes are omitted).

The drive unit(s) in the above exemplary embodiment may be any of motorized equipment such as a rotary motor, a linear movement motor, a linear motor, a single-axis robot and an articulated robot, actuators such as an air cylinder, a hydraulic cylinder, a rodless cylinder and a rotary cylinder, and any direct or indirect combination thereof (including the arrangements exemplarily described in the exemplary embodiment).

The invention claimed is:

1. A sheet manufacturing device configured to manufacture a carbon nanotube sheet with carbon nanotubes transferred on a first sheet, the sheet manufacturing device comprising:
a feeder configured to feed the first sheet; and
a transferring unit configured to transfer the carbon nanotubes onto the first sheet, wherein the carbon nanotubes transferred on the first sheet have a length exceeding a width of the first sheet, and the width of the first sheet is a width between two longitudinal edges of the first sheet,
the transferring unit comprising:
a drawing unit configured to draw the carbon nanotubes from a grown form of the carbon nanotubes in a direction intersecting with a feeding direction of the first sheet from one of the longitudinal edges of the first sheet to the other one of the longitudinal edges, wherein the carbon nanotubes are drawn until front ends of the carbon nanotubes go beyond the other one of the longitudinal edges; and
a cutter configured to cut the carbon nanotubes drawn by the drawing unit at a position off the first sheet to form rear ends of the drawn carbon nanotubes such that the carbon nanotubes transferred on the first sheet have the length exceeding the width of the first sheet.

2. The sheet manufacturing device according to claim 1, further comprising:
a separating unit configured to separate a second sheet from a raw sheet comprising the first sheet and the second sheet that has been temporarily attached to a surface of the first sheet;
a diverting unit configured to divert the separated second sheet; and
a laminating unit configured to laminate the second sheet onto the carbon nanotubes transferred on the first sheet.

3. The sheet manufacturing device according to claim 1, wherein
the feeder is configured to feed the first sheet laminated with the carbon nanotubes aligned along the feeding direction of the first sheet, and
the transferring unit is configured to transfer the drawn carbon nanotubes onto the first sheet.

4. A sheet manufacturing method for manufacturing a carbon nanotube sheet with carbon nanotubes transferred on a first sheet, the sheet manufacturing method comprising:
feeding the first sheet; and
transferring the carbon nanotubes onto the first sheet, wherein the carbon nanotubes transferred on the first sheet have a length exceeding a width of the first sheet, and the width of the first sheet is a width between two longitudinal edges of the first sheet,
the transferring comprising:
drawing the carbon nanotubes from a grown form of the carbon nanotubes in a direction intersecting with a feeding direction of the first sheet from one of the longitudinal edges of the first sheet to the other one of the longitudinal edges, wherein the carbon nanotubes are drawn until front ends of the carbon nanotubes go beyond the other one of the longitudinal edges; and
cutting the carbon nanotubes drawn by the drawing at a position off the first sheet to form rear ends of the drawn carbon nanotubes such that the carbon nanotubes transferred on the first sheet have the length exceeding the width of the first sheet.

5. The sheet manufacturing method according to claim 4, wherein
the feeding the first sheet includes feeding the first sheet laminated with the carbon nanotubes aligned along the feeding direction of the first sheet, and
the transferring comprises transferring the drawn carbon nanotubes onto the first sheet.

* * * * *